(12) United States Patent
Zhang-Watson et al.

(10) Patent No.: US 11,326,046 B2
(45) Date of Patent: May 10, 2022

(54) ADHESIVE COMPOSITION

(71) Applicant: Dow Global Technologies LLC, Midland, MI (US)

(72) Inventors: Ling Zhang-Watson, Missouri City, TX (US); Wanfu Ma, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/497,037

(22) PCT Filed: Mar. 29, 2017

(86) PCT No.: PCT/CN2017/078528
§ 371 (c)(1),
(2) Date: Sep. 24, 2019

(87) PCT Pub. No.: WO2018/176250
PCT Pub. Date: Oct. 4, 2018

(65) Prior Publication Data
US 2020/0377707 A1    Dec. 3, 2020

(51) Int. Cl.
*C08L 23/14*    (2006.01)

(52) U.S. Cl.
CPC ......... *C08L 23/14* (2013.01); *C08L 2205/025* (2013.01); *C08L 2205/03* (2013.01)

(58) Field of Classification Search
CPC ......... C08L 93/04; C08L 91/06; C08L 23/14; C09J 191/06; C09J 123/12
See application file for complete search history.

(56) References Cited

U.S. PATENT DOCUMENTS 5,246,998 A * 9/1993 Wideman ................. C08L 9/00
524/270
2015/0018470 A1    1/2015 Nakatani 2016/0060495 A1    3/2016 Neumann et al.
2017/0247584 A1    8/2017 Jin et al.
2018/0320033 A1    11/2018 Jin et al.

FOREIGN PATENT DOCUMENTS

| CN | 105585961 A | 5/2016 |
| WO | 2015/013472 A1 | 1/2015 |
| WO | 2016/028909 A1 | 2/2016 |
| WO | 2016/029006 A1 | 2/2016 |
| WO | 2016/029012 A1 | 2/2016 |

OTHER PUBLICATIONS

Mess et al "Qualitative Analysis of Tackifier Resins in Pressure Sensitive Adhesives Using Direct Analysis in Real Time Time-of-Flight Mass Spectrometry", Anal. Chem. 2011, 83, 7323-7330, published on Aug. 26, 2011.*
Clariant: "Product Data Sheet—Waxes Business Unit Additives Licocene PP 1502 granules Licocene Performance Polymer Product Description Propylene-Ethylene-Copolymer Wax", Oct. 15, 2012, retrieved from the internet: URL: https://www.//palmerholland.com/Assets/User/Documents/Product/42190/271/MITM02961.pdf [retrieved on Jun. 29, 2020].

* cited by examiner

*Primary Examiner* — Gregory Listvoyb
(74) *Attorney, Agent, or Firm* — Quarles & Brady LLP

(57) ABSTRACT

The present disclosure provides a composition. In an embodiment a composition is provided and includes: (A) a propylene-based interpolymer having the following: (i) a density from 0.850 g/cc to 0.900 g/cc; and (ii) a melt viscosity, at 177° C., less than, or equal to, 10,000 mPa·s.; and (B) a rosin ester containing the following: (i) greater than, or equal to, 75 mol % aliphatic carbon, based on total moles of carbon in the rosin ester; and (ii) less than, or equal to, 3.0 mol % ester group carbon, based on total moles of carbon in the rosin ester.

10 Claims, 1 Drawing Sheet

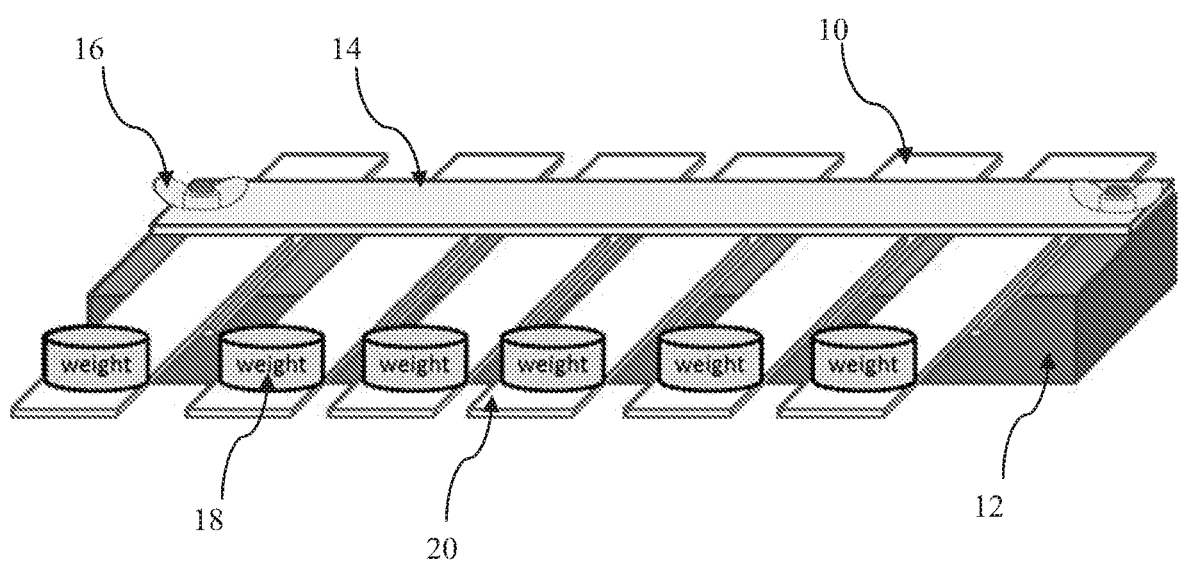

ADHESIVE COMPOSITION

BACKGROUND

In the adhesive industry, single site catalyzed polyolefin elastomers have generally been formulated with hydrogenated tackifiers for hot melt adhesives (HMA), to achieve superior adhesive performance. However, hydrogenated tackifiers are expensive to produce, and can be in tight supply as petroleum feedstock supply tightens. Rosin-based tackifiers (tackifiers derived from rosin) are naturally occurring and lower in cost than hydrogenated tackifiers. A need exists for new adhesive compositions containing rosin-based tackifiers, and which have improved compatibility between polyolefin elastomers and the rosin-based tackifier, as well as suitable adhesive performance.

Moreover, due to the short supply and increasing cost of tackifier, market demand is growing for HMA formulations containing greater polymer content and less tackifier. However, reducing the amount of tackifier and increasing the amount of polymer has the drawback of deteriorated adhesion of the HMA composition when using traditional tackifiers. Conventional tackifiers are disclosed in, for example, WO 2015/013472; WO 2016/028909; WO 2016/029006; WO 2016/029012; International Application Number PCT/US2016/53040, filed 22 Sep. 2016; U.S. Provisional Application No. 62/345,433, filed 3 Jun. 2016; and U.S. Publication Number 2015/0018470; JP 2002526592; and JP 2008045138. CN 105585961A discloses a rosin ester tackifier that may be used in adhesives, but is silent on a HMA formulation containing greater polymer content and less tackifier, and on the type of polymer included in said formulation. A need exists for a HMA composition with reduced tackifier, while maintaining suitable adhesion properties.

SUMMARY

The instant disclosure provides a composition suitable for adhesive applications, and further for holt-melt adhesive applications. The present disclosure provides a composition. In an embodiment, a composition is provided and includes: (A) a propylene based interpolymer having (i) a density from 0.850 g/cc to 0.900 g/cc; and (ii) a melt viscosity, at 177° C., less than, or equal to, 10,000 mPa·s; and (B) a rosin ester containing (i) greater than, or equal to, 75 mol % aliphatic carbon, based on the total moles of carbon in the rosin ester; and (ii) less than, or equal to, 3.0 mol % ester group carbon, based on total moles of carbon in the rosin ester.

BRIEF DESCRIPTION OF THE DRAWINGS

FIG. 1 is a schematic representation of a heat stress sample holder in accordance with an embodiment of the present disclosure.

DEFINITIONS

Any reference to the Periodic Table of Elements is that as published by CRC Press, Inc., 1990-1991. Reference to a group of elements in this table is by the new notation for numbering groups. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art. The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.). Unless stated to the contrary, implicit from the context, or customary in the art, all parts and percents are based on weight and all test methods are current as of the filing date of this disclosure.

An "adhesive composition" is a mixture of components that is capable of joining substrates of interest together under an application of heat and/or pressure. A nonlimiting example of a suitable adhesive composition is a hot melt adhesive (HMA) composition. A "hot melt adhesive (HMA) composition" is a mixture of components that is capable of joining substrates of interest together under the application of heat, or more typically, the application of heat and pressure.

The term "alkyl group" refers to an organic radical derived from an aliphatic hydrocarbon by deleting one hydrogen atom therefrom. An alkyl group may be a linear, branched, cyclic or a combination thereof. In an embodiment, the alkyl group is a $C_1$-$C_{20}$ alkyl group.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed.

The term "heteroatom" refers to an atom other than carbon or hydrogen. Nonlimiting examples of suitable heteroatoms include: F, Cl, Br, N, O, P, B, S, Si, Sb, Al, Sn, As, Se and Ge.

The terms, "hydrocarbyl" and "hydrocarbon" refer to substituents containing only hydrogen and carbon atoms, including branched or unbranched, saturated or unsaturated, cyclic, polycyclic or noncyclic species. Nonlimiting examples include alkyl-, cycloalkyl-, alkenyl-, alkadienyl-, cycloalkenyl-, cycloalkadienyl-, aryl-, and alkynyl-groups.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," as defined hereinafter. Trace amounts of impurities, for example, catalyst residues, may be incorporated into and/or within the polymer.

An "interpolymer" is a polymer prepared by the polymerization of at least two different types of monomers. The generic term interpolymer thus includes copolymers (employed to refer to polymers prepared from two different types of monomers), and polymers prepared from more than two different types of monomers.

An "olefin-based polymer" or "polyolefin" is a polymer that contains a majority amount of polymerized olefin monomer, for example, ethylene or propylene, (based on the weight of the polymer), and optionally, may contain at least one comonomer. Nonlimiting examples of an olefin-based polymer include an ethylene-based polymer and a propylene-based polymer.

An "ethylene-based polymer" or "ethylene polymer" is a polymer that contains a majority amount of polymerized ethylene based on the weight of the polymer, and, optionally, may comprise at least one comonomer.

An "ethylene/α-olefin interpolymer" is an interpolymer that contains a majority amount of polymerized ethylene, based on the weight of the interpolymer, and at least one α-olefin. An "ethylene/α-olefin copolymer" is an interpolymer that contains a majority amount of polymerized ethylene, based on the weight of the copolymer, and an α-olefin, as the only two monomer types.

A "propylene-based polymer" is a polymer that contains a majority amount of polymerized propylene based on the weight of the polymer, and, optionally, may comprise at least one comonomer. A "propylene-based interpolymer" is an interpolymer that contains, in polymerized form, a majority amount of propylene, based on the weight of the interpolymer, and at least one comonomer. Preferably, the propylene-based interpolymer is a random interpolymer (i.e., comprises a random distribution of it monomeric constituents).

A "propylene/α-olefin interpolymer" is an interpolymer that contains, in polymerized form, a majority amount of propylene, based on the weight of the interpolymer, and at least one α-olefin. A "propylene/α-olefin copolymer" is a copolymer that contains, in polymerized form, a majority amount of propylene, based on the weight of the copolymer, and an α-olefin, as the only two monomer types. Preferably, the propylene-based interpolymer or copolymer is a random interpolymer or copolymer (i.e., comprises a random distribution of it monomeric constituents).

A "propylene/ethylene interpolymer" is an interpolymer that contains, in polymerized form, a majority amount of propylene, based on the weight of the interpolymer, and at least ethylene. A "propylene/ethylene copolymer" is a copolymer that contains, in polymerized form, a majority amount of propylene, based on the weight of the copolymer, and ethylene, as the only two monomer types. Preferably, the propylene-based interpolymer or copolymer is a random interpolymer or copolymer (i.e., comprises a random distribution of it monomeric constituents).

DETAILED DESCRIPTION

The instant disclosure provides a composition suitable for holt-melt adhesive applications. The composition includes: (A) a propylene based interpolymer having (i) a density from 0.850 g/cc to 0.900 g/cc; and (ii) a melt viscosity, at 177° C., less than, or equal to, 10,000 mPa·s; and (B) a rosin ester containing (i) greater than, or equal to, 75 mol % aliphatic carbon, based on the total moles of carbon in the rosin ester; and (ii) less than, or equal to, 3.0 mol % ester group carbon, based on total moles of carbon in the rosin ester.

A composition may comprise a combination of two or more embodiments as described herein.

In an embodiment, the present composition further includes a propylene-based polymer wax that has a melt viscosity, at 170° C., from 40 to 100 mPa·s, or from 45 to 90 mPa·s, or from 50 to 80 mPa·s, or from 55 to 70 mPa·s, and density from 0.88 to 0.92 g/cc, or from 0.89 to 0.91 g/cc. In a further embodiment, the weight ratio of the propylene-based interpolymer to the propylene-based polymer wax is from 2.0:1.0 to 5.0:1.0, or from 2.1:1.0 to 4.5:1.0, or from 2.2:1.0 to 4.0:1.0, or from 2.3:1.0 to 3.5:1.0, or from 2.4:1.0 to 3.0:1.0. In an embodiment, the weight ratio of the rosin ester to the propylene-based polymer wax is from 0.4:1.0 to 1.0:1.0, or from 0.5:1.0 to 0.9:1.0, or from 0.6:1.0 to 0.8:1.0.

In an embodiment, the present composition further includes a propylene-based polymer wax that has a melt viscosity, at 170° C., from 40 to 100 mPa·s, or from 45 to 90 mPa·s, or from 50 to 80 mPa·s, or from 55 to 70 mPa·s, and density from 0.88 to 0.92 g/cc, or from 0.89 to 0.91 g/cc. In a further embodiment, the propylene-based interpolymer is present in an amount from 2.0 to 50.0 wt %, or from 5.0 to 50.0 wt %, or from 10.0 to 50.0 wt %, based on the weight of the composition. In a further embodiment, the weight ratio of the propylene-based interpolymer to the propylene-based polymer wax is from 2.0:1.0 to 42.0:1.0, or from 5.0:1.0 to 20.0:1.0, or from 8.0:1.0 to 10.0:1.0. In an embodiment, the weight ratio of the rosin ester to the propylene-based polymer wax is from 2.0:1.0 to 10.0:1.0, or from 4.0:1.0 to 10:1.0, or from 8.0:1.0 to 10.0:1.0.

In an embodiment the composition is an adhesive composition, and further a hot melt adhesive (HMA) composition. Although the following disclosure is directed to HMA compositions, it is understood that the following disclosure is applicable to other adhesive compositions, such as pressure sensitive adhesive compositions, for example.

A. Propylene-Based Interpolymer

The present adhesive composition includes a propylene-based interpolymer. Preferably, the propylene-based interpolymer is a random interpolymer.

In an embodiment, the propylene-based interpolymer is selected from a propylene/α-olefin interpolymer, or a propylene/α-olefin copolymer. Nonlimiting examples of suitable α-olefins include, for example, $C_2$; $C_4$-$C_{20}$ α-olefins; $C_4$-$C_{10}$ α-olefins; $C_4$-$C_8$ α-olefins; $C_4$; $C_5$; $C_6$; and $C_8$ α-olefins. In an embodiment, the propylene-based interpolymer is selected from a propylene/ethylene interpolymer, or a propylene/ethylene copolymer.

In an embodiment, the propylene-based interpolymer contains greater than 50 wt % units derived from propylene, or from 51 wt %, or 55 wt %, or 60 wt %, or 65 wt % to 70 wt %, or 75 wt %, or 80 wt %, or 85 wt %, or 90 wt %, or 95 wt %, or 98 wt %, or 99 wt % units derived from propylene, based on the weight of the propylene-based interpolymer.

In an embodiment, the propylene-based interpolymer has a total unsaturation per mole of propylene from 0.01%, or 0.015% to 0.025%, or 0.03%. The total unsaturation per mole of propylene is measured by $^1H$ NMR analysis, as described below in the test methods section. In a further embodiment, the propylene-based interpolymer is a propylene/α-olefin interpolymer, and further a propylene/ethylene interpolymer. In another embodiment, the propylene-based interpolymer is a propylene/α-olefin copolymer, and further a propylene/ethylene copolymer. Nonlimiting examples of suitable α-olefins include, for example, $C_2$, $C_4$, $C_5$, $C_6$ and $C_8$ α-olefins.

In an embodiment, the propylene-based interpolymer has a melt viscosity, at 177° C., from 500 mPa·s, or 750 mPa·s, or 1,000 mPa·s, or 1,500 mPa·s or 2,000 mPa·s to 3,000 mPa·s, or 3,500 mPa·s or 4,000 mPa·s, or 5,000 mPa·s, or 6,000 mPa·s, or 7,000 mPa·s, or 8,000 mPa·s, or 9,000 mPa·s, or 10,000 mPa·s. In an embodiment, the propylene-based interpolymer has a melt viscosity, at 177° C., from 500 mPa·s to 10,000 mPa·s; or from 500 mPa·s to 8,000 mPa·s; or from 500 mPa·s to 5,000 mPa·s; or from 500 mPa·s to 4,000 mPa·s, or from 500 mPa·s to 3,500 mPa·s, or from 500 mPa·s to 3,000 mPa·s. In a further embodiment, the propylene-based interpolymer is a propylene/α-olefin interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_2$, $C_4$, $C_5$, $C_6$ and $C_8$ α-olefins.

In an embodiment, the propylene-based interpolymer has a branching index (g') from 0.95, or 0.99 to 1.0, or 1.01, or 1.05. In an embodiment, the propylene-based interpolymer has a branching index (g') equal to 1.0. In a further embodiment, the propylene-based interpolymer is a propylene/α-olefin interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_2$, $C_4$, $C_5$, $C_6$ and $C_8$ α-olefins.

In an embodiment, the propylene-based interpolymer has a crystallinity from 1 wt %, or 10 wt %, or 15 wt %, or 20 wt %, or 25 wt % to 30 wt %, or 35 wt %, or 40 wt % In an embodiment, the propylene-based interpolymer has a crystallinity from 10 to 40 wt %, or from 15 to 35 wt %, or from 20 to 30 wt %. In a further embodiment, the propylene-based interpolymer is a propylene/α-olefin interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_2$, $C_4$, $C_5$, $C_6$ and $C_8$ α-olefins.

In an embodiment, the propylene-based interpolymer has a heat of fusion ($H_f$) from 40 J/g, or 42 J/g, or 44 J/g to 50 J/g, or 55 J/g, or 60 J/g to 70 J/g, or 75 J/g, or 80 J/g. In a further embodiment, the propylene-based interpolymer is a propylene/α-olefin interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_2$, $C_4$, $C_5$, $C_6$ and $C_8$ α-olefins.

In an embodiment, the propylene-based interpolymer has a density from 0.850 g/cc, or 0.855 g/cc, or 0.860 g/cc, or 0.865 g/cc, or 0.870 g/cc, or 0.875 g/cc, or 0.880 g/cc to 0.885 g/cc, or 0.890 g/cc, or 0.895 g/cc, or 0.900 g/cc. In a further embodiment, the propylene-based interpolymer is a propylene/α-olefin interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_2$, $C_4$, $C_5$, $C_6$ and $C_8$ α-olefins.

In an embodiment, the propylene-based interpolymer has a melting temperature, Tm, from 85° C., or 90° C., or 95° C., or 98° C. to 100° C., or 110° C., or 115° C., or 120° C. In a further embodiment, the propylene-based interpolymer is a propylene/α-olefin interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_2$, $C_4$, $C_5$, $C_6$ and $C_8$ α-olefins.

In an embodiment, the propylene-based interpolymer has a weight average molecular weight (Mw) from 20,000 g/mol, or 22,000 g/mol, or 25,000 g/mol to 40,000 g/mol, or 48,000 g/mol, or 50,000 g/mol. In a further embodiment, the propylene-based interpolymer is a propylene/α-olefin interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_2$, $C_4$, $C_5$, $C_6$ and $C_8$ α-olefins.

In an embodiment, the propylene-based interpolymer has a Mw/Mn from 1.8, or 2.0, or 2.1, or 2.2 to 2.4, or 2.5, or 3.0, or 3.5. In a further embodiment, the propylene-based interpolymer is a propylene/α-olefin interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_2$, $C_4$, $C_5$, $C_6$ and $C_8$ α-olefins.

1. B-Value

The term "B-value" is a measure of randomness and measures the distribution of the propylene and comonomer across the polymer chain of the propylene-based interpolymer. For a propylene/ethylene copolymer, the "B-value" is a measure of randomness and measures the distribution of the propylene and ethylene across the polymer chain of the propylene/ethylene copolymer. B-values range from 0 to 2. The higher the B-value, the more alternating the ethylene distribution in the copolymer. The lower the B-value, the more blocky or clustered the ethylene distribution in the propylene/ethylene copolymer.

In an embodiment, the propylene-based interpolymer has a B-value of less than 1.0, or less than 0.99, or less than 0.98. In an embodiment, the propylene-based interpolymer has a B-value from 0.90, or 0.92, or 0.93, or 0.94 to 0.95, or 0.96, or 0.97, or 0.98, or 0.99. In a further embodiment, the propylene-based interpolymer is a propylene/ethylene interpolymer, and further a propylene/ethylene copolymer. In another embodiment, the propylene-based interpolymer is a propylene/α-olefin copolymer, and further a propylene/ethylene copolymer. Nonlimiting examples of suitable α-olefins include, for example, $C_2$, $C_4$, $C_5$, $C_6$ and $C_8$ α-olefins.

The B-value as described by Koenig (*Spectroscopy of Polymers* (2d ed. 1999) is calculated as follows. B is defined for a propylene/ethylene copolymer as:

$$B = \frac{f(EP + PE)}{2 \cdot F_E \cdot F_P},$$

where f(EP+PE)=the sum of the EP and PE diad fractions; and Fe and Fp=the mole fraction of ethylene and propylene in the copolymer, respectively. The diad fraction can be derived from triad data according to: f(EP+PE)=[EPE]+[EPP+PPE]/2+[PEP]+[EEP+PEE]/2. The B-values can be calculated for other copolymers in an analogous manner by assignment of the respective copolymer diads. For example, calculation of the B-value for a propylene/1-octene copolymer uses the following equation:

$$B = \frac{f(OP + PO)}{2 \cdot F_O \cdot F_P}.$$

A propylene/ethylene interpolymer may comprise two or more embodiments disclosed herein. A propylene/ethylene copolymer may comprise two or more embodiments disclosed herein. A propylene/α-olefin interpolymer may comprise two or more embodiments disclosed herein. A propylene/α-olefin copolymer may comprise two or more embodiments disclosed herein.

2. Suitable Catalyst for the Propylene-Based Interpolymer

In an embodiment, the propylene-based interpolymer, further a propylene/ethylene interpolymer, further a propylene/ethylene copolymer, is made with a (i) catalyst that is a Group IV metal complex of a polyvalent aryloxyether, (ii) an activator, and/or (iii) a cocatalyst. The catalyst is capable of producing polymers from propylene containing monomer mixtures having extremely high molecular weight and isotacticity, at catalyst efficiencies of greater than 0.5 $g_{polymer}/\mu g_{metal}$, allowing the use of a chain transfer agent to control molecular weight without sacrificing molecular weight distribution. A sufficient quantity of chain transfer agent is used so that a substantial decrease in molecular weight (>30 percent) occurs compared to a comparative polymerization without the use of chain transfer agent. When the chain transfer agent is hydrogen, at least 0.01 mole percent (based on propylene) is used, and a maximum of 2 mole percent is used. Highly isotactic polymers can be prepared with high levels of chain transfer agents, while still affording narrow molecular weight distribution polymers and using low levels of alumoxane activators. Generally, use of high levels of chain transfer agent with more conventional catalysts results in production of polymers having broadened molecular weight distributions. Nonlimiting examples of suitable Group IV metals include titanium, zirconium, and hafnium.

The catalyst of Group IV metal complex of a polyvalent aryloxyether imparts unique properties to the propylene-based interpolymer, and further the propylene/ethylene copolymer, as described herein.

In an embodiment, the propylene-based interpolymer, further a propylene/ethylene interpolymer, further a propylene/ethylene copolymer, is characterized as having substantially isotactic propylene sequences. "Substantially isotactic propylene sequences" are sequences having an isotactic triad (mm) measured by $^{13}C$ NMR of greater than 0.85, or greater than 0.90, or greater than 0.92, or greater than 0.93, or greater than 0.94. Isotactic triads refer to the isotactic sequence in terms of a triad unit in the copolymer molecular chain determined by $^{13}C$ NMR spectroscopy. In an embodiment, the Group IV metal complex is a hafnium-based polyvalent aryloxyether.

Nonlimiting examples of suitable Group IV metal complex of a polyvalent aryloxyether include [[2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl hafnium; and [[2',2'''-[1,3-propanediylbis(oxy-κO)]bis-{3-[9H-3,6-di-(1,1-dimethylethyl)-carbazol-9-yl]}-5'-fluoro-5-(1,1,3,3-tetramethylbutyl)-[1,1'-biphenyl]-2-olato-κO]](2-)]dimethyl hafnium. The metal complexes are activated in various ways to yield catalyst compounds having a vacant coordination site that will coordinate, insert, and polymerize addition polymerizable monomers, especially olefin(s). For the purposes of this patent specification and appended claims, an "activator" or "cocatalyst" is any compound or component or method which can activate the metal complex in the foregoing manner Non-limiting examples of suitable activators include Lewis acids, non-coordinating ionic activators, ionizing activators, organometallic compounds, and combinations of the foregoing substances capable of converting the neutral metal complex to a catalytically active species.

In an embodiment, catalyst activation may involve formation of a cationic, partially cationic, or zwitterionic species, by proton transfer, oxidation, or other suitable activation process. The present disclosure is operable and fully enabled regardless of whether or not such an identifiable cationic, partially cationic, or zwitterionic species actually results during the activation process, also known as an "ionization" process or "ionic activation process."

Ionizing cocatalysts may contain an active proton, or some other cation associated with, but not coordinated to or only loosely coordinated to, an anion of the ionizing compound. Nonlimiting examples include ammonium cation containing salts, especially those containing trihydrocarbyl-substituted ammonium cations containing one or two $C_{10-40}$alkyl groups, especially methylbis(octodecyl)-ammonium- and methylbis(tetradecyl)-ammonium-cations and a non-coordinating anion, especially a tetrakis(perfluoro)arylborate anion, especially tetrakis(pentafluorophenyl)borate. The cation may comprise a mixture of hydrocarbyl groups of differing lengths. For example, the protonated ammonium cation derived from the commercially available long-chain amine comprising a mixture of two $C_{14}$, $C_{16}$ or $C_{18}$ alkyl groups and one methyl group. Such amines are available from Chemtura Corp., under the trade name Kemamine™ T9701, and from Akzo Nobel under the trade name Armeen™ M2HT. In an embodiment, the ammonium salt activator is methyl di($C_{14-20}$ alkyl)ammonium tetrakis(pentafluorophenyl)borate.

Another suitable class of organometallic activators or cocatalysts is alumoxanes, also referred to as alkylaluminoxanes. Alumoxanes are well known activators for use with metallocene type catalyst compounds to prepare addition polymerization catalysts. Nonlimiting examples include alumoxanes that are Lewis acid modified alumoxanes, especially tri($C_{3-6}$)alkylaluminum modified methylalumoxane, including tri(isobutyl)aluminum modified methalumoxane, available commercially as MMAO-3A, from Akzo Nobel, or tri(n-octyl)aluminum modified methalumoxane, available commercially as MMAO-12, from Akzo Nobel. Combinations of activators are also contemplated by the present disclosure, for example, alumoxanes and ionizing activators in combination.

Within the scope of this disclosure is the use of alumoxane(s) or modified alumoxane(s) as an activator or as a tertiary component. That is, the compound may be used alone or in combination with other activators, either neutral or ionic, such as tri(alkyl)ammonium tetrakis(pentafluorophenyl)borate compounds, tris(perfluoroaryl) compounds, polyhalogenated heteroborane anions, and combinations of two or more of these materials. In this embodiment, the alumoxane may not contribute significantly to actual catalyst activation. Notwithstanding the foregoing, some participation of the alumoxane in the activation process is not necessarily excluded.

Suitable alumoxanes include polymeric or oligomeric alumoxanes, especially methylalumoxane (MAO) as well as Lewis acid-modified alumoxanes, especially trihydrocarbylaluminum-, halogenated tri(hydrocarbyl)aluminum-, or halogenated tri(hydrocarbyl)boron-modified alumoxanes, having from 1 to 10 carbons in each hydrocarbyl or halogenated hydrocarbyl group. Nonlimiting examples of suitable Lewis acid-modified alumoxane compounds are tri(i-butyl)aluminum-modified methalumoxane and tri(n-octyl)aluminum modified methalumoxane containing from 10 to 30, or 15 to 25 mole percent i-butyl content and 10 to 20, or 12 to 18 mole percent n-octyl content, respectively, the molar percents based on total alkyl ligand content. In an embodiment, the alumoxane or Lewis acid-modified alumoxane activator is utilized in molar ratios of cocatalyst:catalyst is from 20 to 200:1, or from 20 to 150:1, or from 20 to 80:1.

Because of the ability to be activated at relatively low levels of alumoxane or Lewis acid-modified alumoxane cocatalysts while maintaining high catalyst efficiency, the present Group IV metal complexes can achieve reduced levels of cocatalyst by-products in the resulting polymer. This in turn allows the polymers to be employed in demanding applications such as those requiring high clarity or low dielectric constant.

In an embodiment, the propylene-based interpolymer, further a propylene/ethylene interpolymer, and further a propylene/ethylene copolymer, has a Koenig B-value of less than 1.0, or less than 0.99, or less than 0.98. The lower the B-value, the more blocky or clustered the ethylene distribution in a propylene/ethylene copolymer. For propylene/ethylene interpolymers made with a Group IV metal complex of a polyvalent aryloxyether catalyst, the B-values are less than 1.0. In an embodiment, the propylene-based interpolymer has a B-value from 0.90, or 0.92, or 0.93, or 0.94 to 0.95, or 0.96, or 0.97, or 0.98, or 0.99. Thus, for propylene/ethylene interpolymer made with the Group IV metal complex of a polyvalent aryloxyether catalyst, not only is the propylene block length relatively long for a given percentage of ethylene, but a substantial amount of long sequences of three or more sequential ethylene insertions are present in the propylene-based interpolymer.

In an embodiment, the propylene-based interpolymer, further a propylene/ethylene interpolymer, further a propylene/ethylene copolymer, has one, some, or all of the following properties: (i) at least 50 wt % units derived from propylene; and/or (ii) a Koenig B-value of less than 1.0; and/or (iii) a total mol % unsaturation propylene from 0.01% to 0.03%; and/or (iv) density from 0.850 g/cc to 0.900 g/cc; and/or (v) a melt viscosity, at 177° C., from 500 mPa·s to 10,000 mPa·s, or from 500 mPa·s to 8,000 mPa·s, or from 500 mPa·s to 5,000 mPa·s, or from 500 mPa·s to 3,000 mPa·s; and/or (vi) a branching index (g') from 0.95, or 0.99 to 1.0, or 1.01, or 1.05; and/or (vii) a crystallinity from 1 wt % to 40 wt %; and/or (viii) a Mw from 20,000 to 50,000 g/mol; and/or (ix) a Mw/Mn from 1.8 to 3.5; and/or (x) sequences having an isotactic triad (mm) measured by $^{13}C$ NMR of greater than 0.85. In a further embodiment, the propylene-based interpolymer, further a propylene/ethylene interpolymer, further a propylene/ethylene copolymer, has all of the above properties (i)-(x).

In an embodiment, the propylene-based interpolymer has one, some, or all of the following properties: (i) at least 50 wt % units derived from propylene and from 1 wt %, or 5 wt % to 7 wt %, or 10 wt % units derived from ethylene; and/or (ii) a Koenig B-value of less than 0.98; and/or (iii) a total mol % unsaturation propylene from 0.01% to 0.03%; and/or (iv) a density from 0.875 g/cc, or 0.880 g/cc, or 0.884 g/cc to 0.885 g/cc, or 0.890 g/cc; and/or (v) a melt viscosity, at 177° C., from 800 mPa·s, or 1,000 mPa·s to 3,000 mPa·s, or 5,000 mPa·s, or 10,000 mPa·s; and/or (vi) a branching index (g') equal to 1.0; and/or (vii) a crystallinity from 15 wt %, or 25% to 30%, or 40 wt %; and/or (viii) an Mw from 20,000, or 25,000 g/mol to 39,000 g/mol, or 50,000 g/mol; and/or (ix) a Mw/Mn from 1.8, or 2.0, or 2.2 to 2.3, or 3.5; and/or (x) sequences having an isotactic triad (mm) measured by $^{13}C$ NMR of greater than 0.85, or greater than 0.94. In a further embodiment, the propylene-based interpolymer has all of the above properties (i)-(x).

In an embodiment, the propylene-based interpolymer is present in the composition in an amount from 45 wt %, or 50 wt %, or 55 wt %, or 59 wt %, or 60 wt %, or 65 wt %, or 69 wt % to 70 wt %, or 71 wt %, or 75 wt %, or 80 wt %, or 85 wt %, or 90 wt %, based on total weight of the composition.

A propylene-based interpolymer may comprise two or more embodiments disclosed herein. A propylene-based copolymer may comprise two or more embodiments disclosed herein.

B. Rosin Ester

The present composition includes a rosin ester. A "rosin ester" refers to a polymer containing, in polymerized form, rosin and, optionally, one or more dienes, which polymeric structure is then esterified with one or more polyols, and then the esterified polymeric structure is optionally hydrogenated. It is understood that as an ester, the rosin ester contains at least one ester group with oxygen atoms, the rosin ester thereby excluding tackifier composed only of hydrogen and carbon atoms. A "polyol" is an alcohol containing at least two hydroxyl groups (—OH).

A "rosin" is a mixture of resin acids, which are carboxylic acids. Nonlimiting examples of suitable rosins include gum rosin, wood rosin, tall oil rosin, and combinations thereof. Nonlimiting examples of suitable resin acids include abietic acid, neoabietic acid, dehydroabietic acid, palustric acid, levopimaric acid, pimaric acid, isopimaric acids, and combinations thereof. In an embodiment, the rosin contains abietic acid. In an embodiment, the abietic acid is present as one or more of the following isomeric structures (Structure (A); Structure (B); Structure (C)):

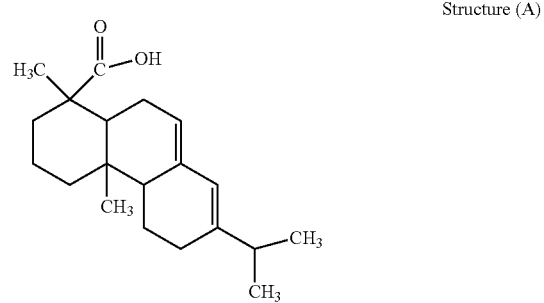

Structure (A)

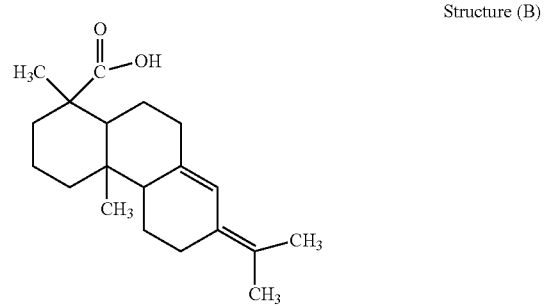

Structure (B)

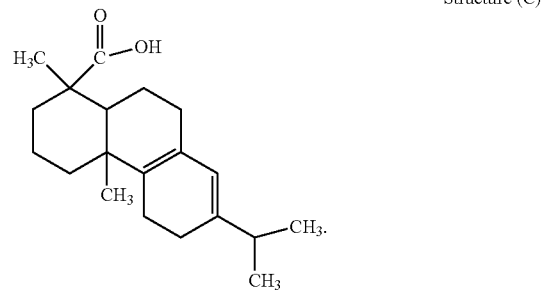

Structure (C)

A "diene" is an unsaturated hydrocarbon containing two double bonds between carbon atoms. The diene can be conjugated-, non-conjugated-, straight chain-, branched chain- or cyclic-hydrocarbon diene having from 6 to 15 carbon atoms. Nonlimiting examples of suitable diene include 1,4-hexadiene; 1,6-octadiene; 1,7-octadiene; 1,9-decadiene; branched chain acyclic diene, such as 5-methyl-1,4-hexadiene, 3,7-dimethyl-1,6-octadiene, 3,7-dimethyl-1,7-octadiene and mixed isomers of dihydromyricene and dihydroocinene; single ring alicyclic dienes, such as 1,3-cyclopentadiene, 1,4-cyclohexadiene, 1,5-cyclooctadiene and 1,5-cyclododecadiene; and multi-ring alicyclic fused and bridged ring dienes, such as tetrahydroindene, methyl tetrahydroindene, dicyclopentadiene, and bicyclo-(2,2,1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene, norbornadiene, 5-ethylidene-2-norbornene (ENB), 5-vinylidene-2-norbornene (VNB), 5-methylene-2-norbornene (MNB), dicyclopentadiene (DCPD); and combinations thereof. Further nonlimiting examples of suitable diene include 4-methyl-1,4-hexadiene, 7-methyl-1,6-octadiene, 5,7-dimethyl-1,6-octadiene, 3,7,11-trimethyl-1,6,10-octatriene, 6-methyl-1,5-heptadiene, 1,3-butadiene, 1,6-heptadiene, 1,8-nonadiene, 1,9-decadiene, 1,10-undecadiene, 1,5-cyclododecadiene, bicyclo[2.2.1]hepta-2,5-diene (norbornadiene), tetracyclododecene, butadiene, dicyclopentadiene, vinyl norbornene, mixed isomers of dihydromyricene and dihydroocinene, tetrahydroindene, methyl tetrahydroindene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and combinations thereof. In an embodiment, the diene is DCPD.

In an embodiment, the rosin ester is a polymer containing, in polymerized form, a rosin containing abietic acid and DCPD, which polymeric structure is then esterified with one or more polyols, and then the esterified polymeric structure is hydrogenated. In an embodiment, the rosin ester is prepared as described in CN 105585961A and/or CN 102977615A, the entire contents of which are each herein incorporated by reference. Nonlimiting examples of suitable rosin esters include KOMOTAC™ KM-100 and KOMOTAC™ KM-100W, each available from Guangdong Komo Co., Ltd.

The rosin ester, suitable for the present compositions, contains greater than, or equal to, 75 mol % aliphatic carbon, based on the total moles of carbon in the rosin ester. An "aliphatic carbon" is a carbon atom covalently bonded to hydrogen or another carbon via a single bond. The aliphatic carbon level pertains to those carbon atoms in the final rosin ester (i.e., the polymerized, esterified, and optionally hydrogenated polymeric structure) that are saturated and bonded to hydrogen or another carbon via a single bond. Aliphatic carbon excludes carbon bonded to a heteroatom, such as oxygen. In an embodiment, the rosin ester contains from 75 mol %, or 76 mol %, or 77 mol %, or 78 mol %, or 79 mol %, or 80 mol %, or 81 mol % to 83 mol %, or 84 mol %, or 85 mol %, or 86 mol %, or 87 mol %, or 88 mol %, or 89 mol %, or 90 mol %, or 91 mol %, or 92 mol %, or 93 mol %, or 94 mol %, or 95 mol % aliphatic carbon, based on the total moles of carbon in the rosin ester.

In an embodiment, the rosin ester contains from 0.5 mol %, or 1.0 mol %, or 1.5 mol %, or 2.0 mol %, or 2.1 mol %, or 2.2 mol % to 2.4 mol %, or 2.5 mol %, or 2.6 mol %, or 2.7 mol %, or 2.8 mol %, or 2.9 mol %, or 3.0 mol % ester group carbon, based on the total moles of carbon in the rosin ester. An "ester group" is a moiety with the following Structure (I):

Structure (I)

An "ester group carbon" is the carbon of the Structure (I) ester group, the carbon atom bonded to one oxygen atom with a double bond and to a second oxygen atom with a single bond.

In an embodiment, the rosin ester contains less than, or equal to, 3.0 mole percent oxygenates, based on the total moles of carbon in the rosin ester. An "oxygenate" is a carbon atom covalently bonded to only one oxygen atom via a single bond; for example, —O—CH$_{(n)}$ (likely, the "non-carbonyl carbon" connected to the divalent oxygen of an ester group, or the carbon of an ether group). Oxygenates exclude carbon atoms covalently bonded to an oxygen atom via a double bond (e.g., the carbonyl carbon of an ester, a ketone, or an aldehyde). In an embodiment, the rosin ester contains from 0.05 mol %, or 0.1 mol %, or 0.5 mol %, or 1.0 mol %, or 1.5 mol %, or 1.8 mol %, or 2.0 mol %, or 2.2 mol %, or 2.4 mol % to 2.5 mol %, or 2.6 mol %, or 2.7 mol %, or 2.8 mol %, or 2.9 mol %, or 3.0 mol % oxygenates, based on the total moles of carbon in the rosin ester.

In an embodiment, the rosin ester contains less than, or equal to, 15 mole percent of a combined amount of unsaturated carbon and aromatic carbon, based on the total moles of carbon in the rosin ester. An "aromatic carbon" is a carbon atom contained in a ring structure (such as a $C_6$ ring structure) that has alternating single and double bonds. An "unsaturated carbon" is a carbon atom that is bonded to an adjacent carbon atom with a double covalent bond or a triple covalent bond. In an embodiment, the rosin ester contains from 0.05 mol %, or 0.1 mol %, or 0.5 mol %, or 1.0 mol %, or 2.0 mol %, or 3.0 mol %, or 4.0 mol %, or 5.0 mol %, or 6.0 mol %, or 7.0 mol %, or 8.0 mol %, or 9.0 mol %, or 10.0 mol %, or 11.0 mol %, or 12.0 mol %, or 12.4 mol % to 12.5 mol %, or 13.0 mol %, or 13.7 mol %, or 14.0 mol %, or 14.5 mol %, or 15.0 mol % of a combined amount of unsaturated carbon and aromatic carbon, based on the total moles of carbon in the rosin ester.

In an embodiment, the rosin ester contains from 0 mol %, or 0.05 mol %, or 0.08 mol %, or 0.10 mol % to 0.15 mol %, or 0.20 mol %, or 0.30 mol %, or 0.40 mol %, or 0.50 mol %, or 1.00 mol % of a combined amount of aldehyde group carbon and ketone group carbon, based on the total moles of carbon in the rosin ester. An "aldehyde group" is a moiety with the following Structure (II):

Structure (II)

An "aldehyde group carbon" is the carbon atom of the Structure (II) aldehyde group, the carbon atom bonded to one oxygen atom with a double bond and a hydrogen atom with a single bond. A "ketone group" is a moiety with the following Structure (III):

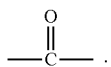

Structure (III)

A "ketone group carbon" is the carbon atom of the Structure (III) ketone group, the carbon atom bonded to one oxygen atom with a double bond.

It is understood that the sum of the molar content of the aliphatic carbon, the ester group carbon, the oxygenates, the unsaturated carbon, the aromatic carbon, the aldehyde group carbon, and the ketone group carbon, yields 100 mole percent (mol %), based on the total moles of carbon in the rosin ester (i.e., the polymerized, esterified, and optionally hydrogenated polymeric structure).

In an embodiment, the rosin ester has a Ring and Ball softening temperature (measured in accordance with ASTM E 28) from 80° C., or 85° C., or 90° C., or 92° C., or 93° C., or 95° C., or 97° C. to 100° C., or 105° C., or 108° C., or 110° C., or 120° C.

In an embodiment, the rosin ester has an acid number (measured in accordance with ASTM D 1386/7) from 15 mg KOH/g, or 20 mg KOH/g, or 25 mg KOH/g to 30 mg KOH/g, or 35 mg KOH/g, or 40 mg KOH/g, or 45 mg KOH/g, or 50 mg KOH/g, or 55 mg KOH/g, or 60 mg KOH/g, or 65 mg KOH/g, or 70 mg KOH/g.

In an embodiment, the rosin ester contains: (i) from 75 mol %, or 76 mol %, or 77 mol %, or 78 mol %, or 79 mol %, or 80 mol %, or 81 mol % to 83 mol %, or 84 mol %, or 85 mol %, or 86 mol %, or 87 mol %, or 88 mol %, or 89 mol %, or 90 mol %, or 91 mol %, or 92 mol %, or 93 mol %, or 94 mol %, or 95 mol % aliphatic carbon; and/or (ii) from 0.5 mol %, or 1.0 mol %, or 1.5 mol %, or 2.0 mol %, or 2.1 mol %, or 2.2 mol % to 2.4 mol %, or 2.5 mol %, or 2.6 mol %, or 2.7 mol %, or 2.8 mol %, or 2.9 mol %, or 3.0 mol % ester group carbon; and/or (iii) from 0.05 mol %, or 0.1 mol %, or 0.5 mol %, or 1.0 mol %, or 1.5 mol %, or 1.8 mol %, or 2.0 mol %, or 2.2 mol %, or 2.4 mol % to 2.5 mol %, or 2.6 mol %, or 2.7 mol %, or 2.8 mol %, or 2.9 mol %, or 3.0 mol % oxygenates; and/or (iv) from 0.05 mol %, or 0.1 mol %, or 0.5 mol %, or 1.0 mol %, or 2.0 mol %, or 3.0 mol %, or 4.0 mol %, or 5.0 mol %, or 6.0 mol %, or 7.0 mol %, or 8.0 mol %, or 9.0 mol %, or 10.0 mol %, or 11.0 mol %, or 12.0 mol %, or 12.4 mol % to 12.5 mol %, or 13.0 mol %, or 13.7 mol %, or 14.0 mol %, or 14.5 mol %, or 15.0 mol % of a combined amount of unsaturated carbon and aromatic carbon; and/or (v) from 0 mol %, or 0.05 mol %, or 0.08 mol %, or 0.10 mol % to 0.15 mol %, or 0.20 mol %, or 0.30 mol %, or 0.40 mol %, or 0.50 mol %, or 1.00 mol % of a combined amount of aldehyde group carbon and ketone group carbon, based on the total moles of carbon in the rosin ester. In an embodiment, the rosin ester has a Ring and Ball softening temperature from 80° C., or 85° C., or 90° C., or 92° C., or 93° C., or 95° C., or 97° C. to 100° C., or 105° C., or 108° C., or 110° C., or 120° C.; and/or an acid number from 15 mg KOH/g, or 20 mg KOH/g, or 25 mg KOH/g to 30 mg KOH/g, or 35 mg KOH/g, or 40 mg KOH/g, or 45 mg KOH/g, or 50 mg KOH/g, or 55 mg KOH/g, or 60 mg KOH/g, or 65 mg KOH/g, or 70 mg KOH/g. In a further embodiment, the rosin ester is a polymer containing, in polymerized form, a rosin containing abietic acid and DCPD, which polymeric structure is then esterified with one or more polyols, and then the esterified polymeric structure is hydrogenated. In a further embodiment, the rosin ester is KOMOTAC™ KM-100, KOMOTAC™ KM-100W, or a combination thereof.

In an embodiment, the rosin ester is present in the composition in an amount from 1 wt %, or 5 wt %, or 9 wt %, or 10 wt %, or 15 wt %, or 19 wt % to 20 wt %, or 21 wt %, or 23 wt %, or 25 wt %, or 28 wt %, or 30 wt %, based on the total weight of the composition.

C. Wax

In an embodiment, the present composition includes an optional wax. The wax may be used to reduce the melt viscosity of the composition. Nonlimiting examples of suitable wax include ethylene-based polymer wax, propylene-based polymer wax, paraffin wax, microcrystalline wax, by-product polyethylene wax, Fischer-Tropsch wax, oxidized Fischer-Tropsch wax, and functionalized wax such as hydroxy stearamide wax and fatty amide wax.

In an embodiment, the wax is a propylene-based polymer. A "propylene-based polymer wax" is a propylene-based polymer having a melt viscosity, at 170° C., that is less than, or equal to (≤) 1,000 mPa·s, or ≤500 mPa·s, or ≤100 mPa·s. The propylene-based polymer wax is composed of a majority amount (i.e., greater than 50 wt %) of polymerized propylene monomer and optional α-olefin comonomer. In an embodiment, the propylene-based polymer wax is a propylene homopolymer. The propylene-based polymer wax may be produced by way of Ziegler-Natta catalyst polymerization or metallocene catalyst polymerization yielding a Ziegler-Natta catalyzed propylene-based polymer wax or a metallocene-catalyzed propylene-based polymer wax, respectively. In an embodiment, the propylene-based polymer wax is a propylene homopolymer, and excludes functionalized wax, polyethylene wax, Fischer-Tropsch wax, animal wax, plant wax, petroleum-derived wax (paraffin wax, microcrystalline wax), and montan wax. Nonlimiting examples of suitable propylene-based polymers are waxes sold under the tradename LICOCENE, available from Clariant. In an embodiment, the propylene-based polymer wax has one or both of the following properties: (i) a density from 0.89 g/cc, or 0.90 g/cc to 0.91 g/cc; and/or (ii) a melt viscosity, at 170° C., from 40 mPa·s, or 50 mPa·s, or 60 mPa·s to 65 mPa·s, or 70 mPa·s, or 75 mPa·s, or 80 mPa·s, or 90 mPa·s, or 100 mPa·s. In an embodiment, the propylene-based polymer wax is present in the composition in an amount from 1 wt %, or 2 wt %, or 3 wt %, or 4 wt %, or 5 wt %, or 10 wt % to 15 wt %, or 20 wt %, or 23 wt %, or 25 wt %, or 30 wt %, based on total weight of the composition.

In an embodiment, the wax is an ethylene-based polymer wax. An "ethylene-based polymer wax" is an ethylene-based polymer having a melt viscosity, at 140° C., that is less than, or equal to (≤) 1,000 mPa·s, or ≤500 mPa·s, or ≤100 mPa·s. The ethylene-based polymer wax is composed of a majority amount (i.e., greater than 50 wt %) of polymerized ethylene monomer and optional α-olefin comonomer. In an embodiment, the ethylene-based polymer wax has one or both of the following properties: (i) a density from 0.900 g/cc, or 0.910 g/cc, or 0.920 g/cc, or 0.930 g/cc to 0.940 g/cc, or 0.950 g/cc, or 0.960 g/cc, or 0.970 g/cc; and/or (ii) a melt viscosity, at 140° C., from 40 mPa·s, or 50 mPa·s, or 60 mPa·s to 65 mPa·s, or 70 mPa·s, or 75 mPa·s, or 80 mPa·s, or 90 mPa·s, or 100 mPa·s. In an embodiment, the ethylene-based polymer wax is present in the composition in an amount from 1 wt %, or 2 wt %, or 3 wt %, or 4 wt %, or 5 wt %, or 10 wt % to 15 wt %, or 20 wt %, or 23 wt %, or 25 wt %, or 30 wt %, based on total weight of the composition.

The wax may comprise two or more embodiments disclosed herein.

D. Additives

The present composition may include one or more optional additives. Nonlimiting examples of suitable additives include plasticizers, oils, stabilizers, antioxidants, pigments, dyestuffs, antiblock additives, polymeric additives, defoamers, preservatives, thickeners, rheology modifiers, humectants, fillers, solvents, nucleating agents, surfactants, chelating agents, gelling agents, processing aids, cross-linking agents, neutralizing agents, flame retardants, fluorescing agents, compatibilizers, antimicrobial agents, water, and combinations thereof.

In an embodiment, the composition includes an antioxidant. The antioxidant protects the composition from degradation caused by reaction with oxygen induced by such things as heat, light, or residual catalyst from the raw materials such as the tackifying resin. Suitable antioxidants include high molecular weight hindered phenols and multifunctional phenols such as sulfur and phosphorous-containing phenol. Representative hindered phenols include; 1,3,5-trimethyl-2,4,6-tris-(3,5-di-tert-butyl-4-hydroxybenzyl)-benzene; pentaerythrityl tetrakis-3(3,5-d i-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate]. Such antioxidants are commercially available from Ciba Specialty Chemicals and include Irganox™ 565, 1010, 1076 and 1726, which are hindered phenols. These are primary antioxidants act as radical scavengers and may be used alone or in combination with other antioxidants such as phosphite antioxidants like Irgafos™ 168, available from Ciba Specialty Chemicals. Phosphite catalysts are considered secondary catalysts and are not generally used alone. These are primarily used as peroxide decomposers. Other available catalysts are Cyanox™ LTDP, available from Cytec Industries, and Ethanox™ 330, available from Albemarle Corp. Many such antioxidants are available either to be used alone or in combination with other such antioxidants.

In an embodiment, the composition includes a nucleating agent. A nonlimiting example of a suitable nucleating agent is Millad® NX8000, available from Milliken Chemical.

In an embodiment, the composition contains from 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt % of one of more additives, based on total weight of the composition.

F. Composition

In an embodiment, the composition is an adhesive composition, and further a hot melt adhesive (HMA) composition. In one embodiment, the composition comprises: (A) from 45 wt % to 90 wt % of the propylene-based interpolymer (for example, a propylene/ethylene interpolymer); (B) from 1 wt % to 30 wt % of the rosin ester; and optionally, (C) from 1 wt % to 30 wt % wax; and optionally, (D) from 0.1 wt % to 3.0 wt % additive.

In an embodiment, the composition is an adhesive composition, and further a hot melt adhesive (HMA) composition, which comprises, or consists of: (A) from 45 wt %, or 50 wt %, or 55 wt %, or 59 wt %, or 60 wt %, or 65 wt %, or 69 wt % to 70 wt %, or 71 wt %, or 75 wt %, or 80 wt %, or 85 wt %, or 90 wt % propylene-based interpolymer (for example, a propylene/ethylene copolymer); (B) from 1 wt %, or 5 wt %, or 9 wt %, or 10 wt %, or 15 wt %, or 19 wt % to 20 wt %, or 21 wt %, or 23 wt %, or 25 wt %, or 28 wt %, or 30 wt % rosin ester; (C) from 0 wt %, or 1 wt %, or 2 wt %, or 3 wt %, or 4 wt %, or 5 wt %, or to 10 wt % to 15 wt %, or 20 wt %, or 23 wt %, or 25 wt %, or 30 wt % of a wax; and (D) from 0 wt %, or 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt % of one or more additives, based on total weight of the composition. In a further embodiment, the wax is a propylene-based polymer wax that has a melt viscosity, at 170° C., from 40 to 100 mPa·s, or from 45 to 90 mPa·s, or from 50 to 80 mPa·s, or from 55 to 70 mPa·s, and density from 0.89 to 0.92 g/cc, or from 0.89 to 0.91 g/cc.

In an embodiment, the combined amount of (A) propylene-based interpolymer (for example, a propylene/ethylene interpolymer) and (B) rosin ester equals at least 60 wt % of the composition. In another embodiment, the combined amount of (A) propylene-based interpolymer (for example, a propylene/ethylene copolymer) and (B) rosin ester equals from 60 wt %, or 65 wt %, or 70 wt %, or 75 wt % to 80 wt %, or 85 wt %, or 90 wt %, or 95 wt % of the total weight of the composition.

In an embodiment, the weight ratio of the (A) propylene-based interpolymer (for example, a propylene/ethylene interpolymer) and (B) rosin ester is from 3.0:1.0, or 3.4:1.0 to 5.5:1.0, or 6.0:1.0.

In an embodiment, the composition has a melt viscosity, at 177° C., from 500 mPa·s, or 750 mPa·s, or 760 mPa·s to 950 mPa·s, or 1,000 mPa·s, or 1,500 mPa·s, or 2,000 mPa·s, or 2,500 mPa·s, or 3,000 mPa·s.

In an embodiment, the composition has a fiber tear greater than, or equal to (≥) 50%, or ≥55%, or ≥60%, or ≥65%, or ≥70%, at a temperature from −40° C. to 60° C. In another embodiment, the composition has a fiber tear from 55%, or 60%, or 65%, or 70% to 100% at a temperature from −40° C. to 60° C.

In an embodiment, the composition has a heat stress≥55° C., or ≥60° C.

In an embodiment, the composition has a peel adhesion failure temperature (PAFT)≥50° C., or from 50° C. to 80° C. In another embodiment, the composition has a shear adhesion failure temperature (SAFT)≥85° C., or from 85° C., or 90° C., or from 100° C. to 120° C.

In an embodiment, the composition has a set time of less than, or equal to (≤)15 seconds, or from 1 second to 14 seconds, or 15 seconds. In another embodiment, the composition has an open time≥20 seconds, or ≥30 seconds, or ≥40 seconds, or ≥50 seconds.

In an embodiment, the composition is an adhesive composition, and further a hot melt adhesive (HMA) composition, which includes: (A) from 45 wt % to 90 wt % propylene-based interpolymer (for example, a propylene/ethylene copolymer); (B) from 1 wt % to 30 wt % rosin ester; optionally, (C) from 1 wt % to 30 wt % wax (for example, a propylene-based polymer wax); and optionally, (D) from 0.1 wt % to 3.0 wt % additive; wherein the combined amount of (A) propylene-based interpolymer (for example, a propylene/ethylene interpolymer) and (B) rosin ester equals from 60 wt %, or 65 wt %, or 70 wt %, or 75 wt % to 80 wt %, or 85 wt %, or 90 wt %, or 95 wt % of the total weight of the composition and the weight ratio of the (A) propylene-based interpolymer and (B) rosin ester is from 3.0:1.0, or 3.4:1.0 to 5.5:1.0, or 6.0:1.0; and the composition has one, some, or all of the following properties: (i) a melt viscosity, at 177° C., from 500 mPa·s, or 750 mPa·s, or 760 mPa·s to 950 mPa·s, or 1,000 mPa·s, or 1,500 mPa·s, or 2,000 mPa·s, or 2,500 mPa·s, or 3,000 mPa·s; and/or (ii) a fiber tear from 55%, or 60%, or 65%, or 70% to 100% at a temperature from −40° C. to 60° C.; and/or (iii) a heat stress≥55° C., or ≥60° C.; and/or (iv) a PAFT of ≥50° C., or from 50° C. to 80° C.; and/or (v) a SAFT of ≥85° C., or from 85° C., or 90° C., or 100° C. to 120° C.; and/or (vi) a set time of ≤15 seconds, or from 1 second to 14 seconds, or 15 seconds; and/or (vii) an open time of ≥20 seconds, or ≥30 seconds, or ≥40 seconds, or ≥50 seconds. In a further embodiment, the composition has at least 2, or at least 3, or at least 4, or at least 5, or at least 6, or all 7 of the above properties (i)-(vii).

It is understood that the sum of the components in each of the compositions disclosed herein, including the foregoing compositions, yields 100 weight percent (wt %).

The composition may comprise two or more embodiments disclosed herein.

G. Article

The present disclosure provides an article. The article includes at least one component formed from the present composition. The composition can be any composition as disclosed above. In an embodiment, the composition is an HMA composition. Nonlimiting examples of suitable articles include HMA bonded cardboard packaging boxes, multilayer articles, wood articles and non-woven articles. In an embodiment, that article includes a substrate. The composition is on at least one surface of the substrate. Nonlimiting examples of suitable substrates include film, sheets, fabric, cardboard and wood. In an embodiment, the composition forms a seal between the at least one surface of the substrate and at least one surface of another substrate.

The present article may comprise two or more embodiments disclosed herein.

Test Methods

Acid value (or acid number) was measured in accordance with ASTM D 1386/7. Acid value is a measure of the amount of unreacted fatty acid present in a substance. The acid value is the number of milligrams of potassium hydroxide required for the neutralization of free fatty acids present in one gram of a substance (e.g., the rosin ester). Units for acid value are mg KOH/g.

Density was measured in accordance with ASTM D792, Method B. The result was recorded in grams (g) per cubic centimeter (g/cc or g/cm$^3$).

Fiber Tear (%) Percent fiber tear (FT) of compositions using Inland corrugated cardboard was determined according to a standardized method. A bead of sample composition (about 0.12-0.13 gram) was applied on to a cardboard coupon (5×6 cm) using an Olinger Bond Tester, and a second coupon was quickly placed on top of the sample composition. Light finger pressure, for about 3 seconds, was applied to hold the bond in place. Samples were conditioned for at least 4 hours at room temperature and 50% relative humidity. Next, samples were conditioned at the test temperatures for 5 hrs. to 24 hrs. Samples (n=5) were pulled apart by hand and the failure mode (fiber tear, cohesive failure, adhesive failure), and the average was recorded.

Heat stress resistance (heat stress) was measured according to the "Suggested Test Method for Determining the Heat Stress Resistance of Hot Melt Adhesives," method T-3006, prepared by the Institute of Packaging Professions (IoPP). To prepare one sample, two cardboard coupons (cut with flutes running in the long direction) having dimensions of 2 inches (50.8 mm)×3 3/16 in (81 mm) and 2 in (50.8 mm)×5 1/2 in (139.7 mm) were bonded by applying 0.00014 lb/in of the composition (about 0.12-0.13 gram) using an Olinger Bond Tester (application temperature 177° C.), and this tester was used to compress the coupons at a constant pressure, and without a further application of heat. The composition was applied perpendicular to the flutes in the center of the shorter coupon and the coupons were bonded such that the composition was 3/4 in (19 mm) from one end of the long coupon. Five replicates were made for each composition. Each coupon was stored for 24 hours, at 22° C.-23° C., and 50% relative humidity. Samples (10) were then loaded into a sample holder (12), with the short coupon end aligned with the edge of the sample holder (12), as shown in FIG. 1. The samples (10) were held in place with a wide plate (14) of the sample holder (10), and the plate (14) was secured by wingnuts (16) to the sample holder (12). A "200 g" weight (18) was attached to the coupon (20), at a distance of 3.94 in (100 mm) from the bond. The weight (18) was secured by placing the peg attached to the weight into a hole made in the end of the longer coupon. The sample holder (12), containing the coupon (20) and the attached weight (18), was then placed into a convection oven (not shown), equilibrated at a set temperature, and remained in the oven for 24 hours. At the end of the 24 hours, if at least 80% of the bonds (i.e., 4 bonds) do not fail, then the sample is considered to have passed heat resistance testing at the test temperature. The oven temperature was varied, until the maximum passing heat stress resistance (temperature) was determined. All new bonded coupon samples were used for each test temperature. Results are reported as heat stress temperature (° C.).

Melt viscosity was measured using a Brookfield Viscometer Model, and a Brookfield RV-DV-II-Pro viscometer spindle 31, at 177° C. for the propylene-based interpolymer, and further the propylene/ethylene copolymer; at 177° C. for the composition; at 140° C. for the ethylene-based polymer wax; and at 170° C. for the propylene-based polymer wax. The sample was poured into an aluminum disposable tube-shaped chamber, which was, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams) was heated to the required temperature until the melted sample was one inch below the top of the sample chamber. The viscometer apparatus was lowered, and the spindle submerged into the middle of the sample chamber, wherein the spindle did not touch the sides of the chamber. Lowering was continued, until the brackets on the viscometer align on the Thermosel. The viscometer was turned on, and set to operate at a steady shear rate, which leads to a torque reading in the range of 40 to 60 percent of the total torque capacity, based on the rpm output of the viscometer. Readings were taken every minute for 15 minutes, or until the values stabilize, at which point, a final reading was recorded.

Ring-and-ball softening point was measured using a Mettler Toledo FP900 Thermosystem according to ASTM E28.

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at 190° C.; the melted sample was then air-cooled to room temperature (25° C.). A 3-10 mg, 6 mm diameter specimen was extracted from the cooled polymer, weighed, placed in a light aluminum pan (50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C. and held isothermal for 3 minutes in order to remove its thermal history. Next, the sample was cooled to −80° C. at a 10° C./minute cooling rate and held isothermal at −80° C. for 3 minutes. The sample was then heated to 180° C. (this is the "second heat" ramp) at a 10° C./minute heating rate. The cooling and second heating curves were recorded. The values determined are extrapolated onset of melting, $T_m$, and extrapolated onset of crystallization, $T_c$. Heat of fusion ($H_f$) (in Joules per gram), and the calculated % crystallinity for polypropylene samples using the Equation below:

% Crystallinity=$((H_f)/165$ J/g$)\times 100$.

The heat of fusion ($H_f$) and the peak melting temperature were reported from the second heat curve. Peak crystallization temperature was determined from the cooling curve.

Melting point, $T_m$, was determined from the DSC heating curve by first drawing the baseline between the start and end of the melting transition. A tangent line was then drawn to the data on the low temperature side of the melting peak. Where this line intersects the baseline is the extrapolated onset of melting ($T_m$). This is as described in Bernhard Wunderlich, *The Basis of Thermal Analysis, in Thermal Characterization of Polymeric Materials* 92, 277-278 (Edith A. Turi ed., 2d ed. 1997).

Crystallization temperature, $T_c$, was determined from a DSC cooling curve as above except the tangent line was drawn on the high temperature side of the crystallization peak. Where this tangent intersects the baseline is the extrapolated onset of crystallization ($T_c$).

Glass transition temperature, $T_g$, was determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines were drawn from below and above the glass transition region and extrapolated through the $T_g$ region. The temperature at which the sample heat capacity was half-way between these baselines is the $T_g$.

Gel Permeation Chromatography (GPC) for Molecular Weight and Branching Index (g)

A high temperature gel permeation chromatography (GPC) system, equipped with Robotic Assistant Deliver (RAD) system was used for sample preparation and sample injection. The concentration detector was an Infra-red detector (IR-5) from Polymer Char Inc. (Valencia, Spain). Data collection was performed using a Polymer Char DM 100 Data acquisition box. The carrier solvent was 1,2,4-trichlorobenzene (TCB). The system was equipped with an on-line solvent degas device from Agilent. The column compartment was operated at 150° C. The columns were four Mixed A LS 30 cm, 20 micron columns. The solvent was nitrogen-purged 1,2,4-trichlorobenzene (TCB) containing approximately 200 ppm 2,6-di-t-butyl-4-methylphenol (BHT). The flow rate was 1.0 mL/min, and the injection volume was 200 µl. A "2 mg/mL" sample concentration was prepared by dissolving the sample in $N_2$ purged and preheated TCB (containing 200 ppm BHT), for 2.5 hours at 160° C., with gentle agitation.

The GPC column set was calibrated by running twenty narrow molecular weight distribution polystyrene standards. The molecular weight (MW) of the standards ranges from 580 g/mol to 8,400,000 g/mol, and the standards were contained in six "cocktail" mixtures. Each standard mixture had at least a decade of separation between individual molecular weights. The equivalent polypropylene molecular weights of each PS standard were calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N.Y. Hellman, & P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}}, \quad (Eq\ 1)$$

where $M_{pp}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration was generated using a fourth order polynomial fit as a function of elution volume. Number average and weight average molecular weights were calculated according to the following equations:

$$M_n = \frac{\Sigma^i Wf_i}{\Sigma^i (Wf_i/M_i)}, \quad (Eq\ 2)$$

$$M_w = \frac{\Sigma^i (Wf_i * M_i)}{\Sigma^i (Wf_i)}, \quad (Eq\ 3)$$

where $Wf_i$ and $M_i$ are the weight fraction and molecular weight of elution component i, respectively.

The mass detector constant, laser light scattering detector constant and viscometer detector constant were determined using a standard reference (reference polymer is a linear polyethylene homopolymer) with a known value of weight average molecular weight (Mw=120,000 g/mol; dn/dc=−0.104 mL/g; MWD=2.9) and intrinsic viscosity (1.873 dL/g). The chromatographic concentrations were assumed low enough to eliminate addressing second Virial coefficient effects (concentration effects on molecular weight).

The Systematic Approach for the determination of detector offset was implemented in a manner consistent with that published by Balke & Mourey et. al. (Mourey & Balke, Chromatography Polym. Chpt 12, (1992)) (Balke, Thitiratsakul, Lew, Cheung & Mourey, Chromatography Polym. Chpt 13, (1992)), using data obtained from the two detectors, while analyzing a standard reference (a linear polyethylene homopolymer) with a known value of weight average molecular weight (Mw=120,000 g/mol; dn/dc=−0.104 mL/g; MWD=2.9) and intrinsic viscosity (1.873 dL/g) and narrow polystyrene standards. The Systematic Approach was used to optimize each detector offset to give molecular weight results as close as possible to those observed using the conventional GPC method.

The absolute weight average molecular weight Mw of the samples were characterized by the LS detector and IR-5 concentration detector using following equation:

$$Mw(\text{abs}) = K_{LS} * \frac{\Sigma(LS_i)}{\Sigma(IR_i)}, \quad (\text{Eq 4})$$

where $\Sigma(LS_i)$ is the response area of the LS detector, $\Sigma(IR_i)$ is the response area of the IR-5 detector, and $K_{LS}$ is the instrument constant which was determined using the standard reference (a linear polyethylene homopolymer) with a known value of weight average molecular weight (Mw=120,000 g/mol; dn/dc=−0.104 mL/g; MWD=2.9), intrinsic viscosity (1.873 dL/g) and concentration.

The absolute molecular weight of each elution volume was calculated by following equation:

$$M_{LS,i} = K_{LS} * \frac{LS_i}{IR_i}. \quad (\text{Eq 5})$$

The intrinsic viscosity of samples were characterized by a viscometer detector and IR-5 concentration detector using following equation:

$$IVw = K_{IV} * \frac{\Sigma(DV_i)}{\Sigma(IR_i)}, \quad (\text{Eq 6})$$

where $\Sigma(DV_i)$ is the response area of the viscometer detector, $\Sigma(IR_i)$ is the response area of the IR-5 detector, and $K_{IV}$ is the instrument constant which was determined using the standard reference (a linear polyethylene homopolymer) with a known value of weight average molecular weight (Mw=120,000 g/mol; dn/dc=−0.104 mL/g; MWD=2.9), intrinsic viscosity (1.873 dL/g) and concentration.

The intrinsic viscosity of each elution volume was calculated by following equation:

$$IV_i = K_{IV} * \frac{DV_i}{IR_i}. \quad (\text{Eq 7})$$

The $M_{LS,i}$ and $IV_i$ values of each elution fraction were used to generate the Mark-Houwink plot of sample.

The branching index (g') value of the elastomer was calculated by following equation:

$$g_i' = (IV_{Sample,i}/IV_{linear\ reference,i}) \quad (\text{Eq. 8}),$$

where the $IV_{linear\ reference,i}$ is the intrinsic viscosity of a linear elastomer reference at the equivalent absolute molecular weight as the sample.

The linear elastomer reference was defined as an elastomer with "exactly" the same amount of comonomers as in the resin characterized. The Mark-Houwink plot of this linear elastomer reference is parallel to a linear polyethylene homopolymer in the detected MW range, and overlaps with the Mark-Houwink plot of the elastomer resin at low MW range—20,000 to 30,000 g/mol in this case. The elastomer molecular weight and intrinsic viscosity were "corrected" by following methods using a short chain branching (SCB) parameter:

$MW_{Elastomer} = (1+SCB\ wt\ \%)*MW_{Linear}$, while the
$IV_{Elastomer} = IV_{Linear}/(1+SCB\ wt\ \%)$.

The weight fraction of SCB ("SCB wt %") and the SCB per 1000 carbon ("SCB/1000C") has the relationship as follows: SCB wt %=[(SCB/1000C*X*14)/14000], where X is the comonomer type—in this case, X=8 for octene and X=3 for propylene.

The SCB and SCB distribution along with MWD can be obtained by using the composition mode of detector IR-5. The "SCB wt %" used is an empirical value which could be consistent, but may not be exactly equal to the comonomer weight fractions in the elastomer, especially when there are multiple comonomers in the elastomer.

By introducing "SCB correction" on absolute molecular weight and intrinsic viscosity, the factor branching index (g') decrease, caused by comonomers, was eliminated. Based on the comonomer level in each elastomer sample, the "SCB correction" may be different. The main criteria of a "SCB correction" is overlaid well with a characterized elastomer sample at low MW fractions—which assumes there was no or very rare LCB. This was completed by adjusting the value of "SCB wt %" level.

Peel Adhesion Failure Temperature (PAFT) and Shear Adhesion Failure Temperature (SAFT)

Peel adhesion failure temperature (PAFT) was tested according to ASTM D 4498 with a 100 gram weight in the peel mode. The tests were started at room temperature (25° C./77° F.) and the temperature was increased at an average rate of 0.5° C./minute.

Shear Adhesion Failure Temperature (SAFT) was measured according to ASTM D 4498 with a 500 gram weight in the shear mode. The tests were started at room temperature (25° C./77° F.) and the oven temperature was ramped at an average rate of 0.5° C./minute. The temperature at which the specimen failed is recorded.

Samples for PAFT and SAFT testing were prepared using two sheets of 40 pound Kraft paper, each of 6×12 in (152×305 mm) dimensions. On the bottom sheet, lengthwise and separated by a gap of 1 in (25 mm), were adhered in parallel fashion two 1.75 in or 2 in (45 mm or 51 mm) wide strips of a one sided, pressure-sensitive tape such as masking tape. The composition sample to be tested was heated to 177° C. (350° F.) and drizzled in an even manner down the center of the gap formed between the tape strips. Then, before the composition can unduly thicken, two glass rods, one rod riding immediately upon the tapes and shimmed on each side of the gap with a strip of the same tape followed by the second rod and (between the two rods) the second sheet of paper, were slid down the length of the sheets. This was done in a fashion such that the first rod evenly spreads the composition in the gap between the tape strips and the second rod evenly compress the second sheet over the top of the gap and on top of the tape strips. Thus, a single 1 inch (25.4 mm) wide strip of sample composition was created between the two tape strips, and bonding the paper sheets. The sheets so bonded were cut crosswise into strips of width 1 inch (25.4 mm) and length of 3 inches (76.2 mm), each strip having a 1×1 in (25×25 mm) adhesive sample bond in the center. The strips were then be employed in the PAFT and SAFT testing, as desired.

Open Time and Set Time

Set Time and Open Time properties were determined using the Olinger Bond Tester, a mechanical testing device used to form and tear test bonds. The Olinger Bond Tester was heated to 350° C. (177° C.). The bottom substrate, 2.5" (63.5 mm)×2" (50.8 mm) corrugated board, moved on a track under the adhesive pot which delivered a bead of polymer approximately ⅟₁₆" (1.6 mm) to ⅛" (3.2 mm) wide, and 1" (25.4 mm) long. The adhesive pot pressure was increased, or decreased, in order to maintain consistent bead size. A top substrate, 2.5" (63.5 mm)×2" (50.8 mm), was applied to the bottom substrate, with a pressure of 2 bars. The Olinger has 2 timers, capable of measuring set-time and open-time potential to the nearest second.

Open Time measurement—is the longest time period between adhesive application to one substrate, and the bonding with a second substrate, that results in a 75% fiber-tearing bond. For testing, compression time (or set time) was set to the time determined by set time measurement to achieve 100% fiber tear. Open time was set at 10 seconds and increased in 10 second intervals until less than 50% fiber tear was achieved. The open time was decreased by 5 sec and % fiber tear determined. Finally, open time was changed by 1 second interval to determine the maximum allowable time to achieve 75% or greater fiber tear.

Set Time measurement—is the minimum compression time required to achieve a fiber-tearing bond. For testing, open time was set at 2 seconds (sec). A bond was formed as the top substrate was compressed onto the bottom substrate. After a preset compression time, a tear test was executed as the top substrate was pulled from the bottom substrate. A visual assessment was then made to determine the percentage of fiber tear achieved under the preset test conditions. The set time was changed in one second intervals, determining the time to achieve 100% fiber tear and less than 75% fiber tear. The set time was recorded as the shortest time, to the nearest second, at which a minimum of 75% fiber tear was obtained.

$^{13}$C NMR Experimental Procedure for Propylene-Based Interpolymers $^{13}$C NMR was used for ethylene content, Koenig B-value, triad distribution, and triad tacticity and is performed as follows:

Sample Preparation (Propylene-ethylene copolymers)—The samples were prepared by adding approximately 2.7 g of a 50/50 mixture of tetrachloroethane-d$_2$/orthodichlorobenzene containing 0.025 M Cr(AcAc)$_3$ to 0.20-0.30 g sample in a Norell 1001-7 10 mm NMR tube. The samples were dissolved and homogenized by heating the tube and its contents to 150° C. using a heating block and heat gun. Each sample was visually inspected to ensure homogeneity.

Data Acquisition Parameters (Propylene-Ethylene Copolymers)—The data was collected using a Bruker 400 MHz spectrometer equipped with a Bruker Dual DUL high-temperature CryoProbe. The data was acquired using 320 transients per data file, a 6 sec pulse repetition delay, 90 degree flip angles, and inverse gated decoupling with a sample temperature of 120° C. All measurements were made on non-spinning samples in locked mode. Samples were allowed to thermally equilibrate for 7 minutes prior to data acquisition. Percent mm tacticity and wt % ethylene was then determined according to methods commonly used in the art.*
*References: For composition (wt % E): S. Di Martino and M. Kelchtermans; J. Appl. Polym. Sci., V 56, 1781-1787 (1995); Tacticity, detailed assignments: V. Busico, R. Cipullo; Prog. Polym. Sci. V 26, 443-533 (2001).

The "Koenig B-value" or chi statistic is one measure of randomness or blockiness in a propylene ethylene random copolymer. A value of 1.0 indicates a random copolymer and a value of zero indicates complete blocks of monomers A and B. A B-value of 2 indicates an alternating copolymer. B=[EP]/(2[P][E]), where [EP] is the total mole fraction of EP dimers (EP+PE, or (EEP+PPE+PEP+EPE)), and [E] is the mole fraction ethylene, and [P]=1−[E]. Jack L. Koenig, *Spectroscopy of Polymers* (2d ed. 1999).

$^{13}$C NMR Experimental Procedure for Rosin Ester $^{13}$C NMR was used for aliphatic carbon content, oxygenates content, aromatic carbon content, unsaturated carbon content, ester group content, aldehyde group content, and ketone group content, and is performed as follows:

Sample Preparation (Rosin Ester)—The samples were prepared in tetrachloroethane-d$_2$ by adding approximately 2.7 g of tetrachloroethane-d$_2$ containing 0.025 M Cr(AcAc)$_3$ to 0.20-0.30 g sample in a Norell 1001-7 10 mm NMR tube. The samples were dissolved and homogenized by heating the tube and its contents to 150° C. using a heating block and heat gun. Each sample was visually inspected to ensure homogeneity.

Data Acquisition Parameters (Rosin Ester)—The data was collected using a Bruker 400 MHz spectrometer equipped with a Bruker Dual DUL high-temperature CryoProbe. The data was acquired using 160 scans per data file, a 6 sec pulse repetition delay, 90 degree flip angles, and inverse gated decoupling with a sample temperature of 120° C. The acquisitions were carried out using a spectral width of 25,000 Hz and a file size of 32K data points. The integral ranges used for quantitation of aliphatic carbon content, oxygenates content, aromatic carbon content, unsaturated carbon content, ester group content, aldehyde group content, and ketone group content are listed below.

| $^{13}$C NMR Integral Ranges Used for Quantitation | |
|---|---|
| Component | Peak(s) Integrated |
| Aldehylde/Ketone Carbonyl | about 200 to 202 ppm |
| Ester Carbonyl | about 175 to 182 ppm |
| Unsaturated/Aromatic Carbon | about 100 to 150 ppm |
| Oxygenates (—O—CH$_{(n)}$—) (likely, the "non-carbonyl carbon" connected to the divalent oxygen of an ester group, or the carbon of an ether group) | about 61 to 71 ppm |
| Aliphatic Carbon | about 10 to 61 ppm |

$^1$H NMR Analysis—Total Unsaturation Per Mole Propylene

Samples were prepared by adding approximately 3.25 g of a 50/50 mixture of tetrachloroethane-d2/perchlorethylene that is 0.0015M in chromium acetylacetonate (relaxation agent) to 0.130 g sample in a 10 mm NMR tube. The samples were dissolved and homogenized by heating the tube and its contents to 110° C. The data was collected using a Bruker 400 MHz spectrometer equipped with a Bruker Dual DUL high-temperature CryoProbe. The unsaturation data was collected using 4 scans per data file, a 15.6 second pulse repetition delay with a sample temperature of 120° C. The acquisition was carried out using spectral width of 10,000 Hz and a file size of 16K data points. The presaturation experiment was run with a modified pulse sequence, lc1prf2.zz1 using 100 scans per data file. The following calculations were used:

Moles of $H$ from propylene: Mol fraction propylene*(integral area δ 3.5–0.2 ppm)

$$\frac{\text{Total moles propylene}}{\text{moles } H \text{ from propylene}}$$
$$6 \text{ protons}$$

-continued

Mol % vinyl unsaturation/mol propylene $$\frac{100 * \text{moles vinyl}}{\text{Total moles propylene}}$$

Mol % Cis/Trans Unsaturation/mol propylene propylene $$\frac{100 * \text{moles cis/trans}}{\text{Total moles propylene}}$$

Mol % trisubstituted unsaturation/mol $$\frac{100 * \text{moles trisub}}{\text{Total moles propylene}}$$

Mol % vinylidene unsaturation/mol propylene $$\frac{100 * \text{moles vinylidene}}{\text{Total moles propylene}}$$

Total mol % unsaturation/mol propylene

Mol % vinyl + Mole cis & trans + Mol % trisub + Mol + vinylidene

Some embodiments of the present disclosure will now be described in detail in the following Examples.

EXAMPLES

1. Preparation of Propylene-Based Interpolymer

Two propylene-based interpolymers (P/E 1 and P/E 2) are produced utilizing Catalyst A, a hafnium metal complex of a polyvalent aryloxyether catalyst that is hafnium, [[2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl. Table 1 below provides the name and structure for Catalyst A.

TABLE 1

Catalyst A hafnium, [[2',2'''-[(1R,2R)-1,2-cylco-hexanediylbis(methyleneoxy-κO)]bis[3-(9H-carbazol-9-yl)-5-methyl[1,1'-biphenyl]-2-olato-κO]](2-)]dimethyl

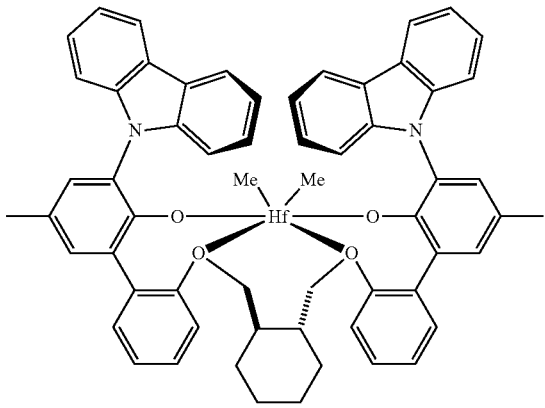

P/E 1 and P/E 2 are made according to the following procedure. Catalyst A and cocatalyst component solutions are metered using pumps and mass flow meters and are combined with the catalyst flush solvent and introduced into the bottom of the reactor. The cocatalyst used is a long-chain alkyl ammonium borate of approximate stoichiometry equal to methyl di(octadecyl)ammonium tetrakis(pentafluorophenyl)borate (MDB) combined with a tertiary component, tri(isobutyl)aluminum modified methalumoxane (MMAO) containing a molar ratio of i-butyl/methyl groups of ⅓. For Catalyst A, the cocatalyst is in a molar ratio based on Hf of 1.2/1, and MMAO (25/1 Al/Hf).

The polymerization process is exothermic. There are about 900 British thermal units (BTUs) are released per pound (2009 kJ/kg) of propylene polymerized and about 1,500 BTUs released per pound (3489 kJ/kg) of ethylene polymerized. The primary process design consideration is the removal of the heat of reaction. The propylene/ethylene (P/E) copolymers are produced in a low-pressure, solution polymerization loop reactor, made up of a 3 inch (76 mm) loop pipe plus two heat exchanges, the total volume of which is 31.4 gallons (118.9 liter). Solvent and monomer (propylene) are injected into the reactor as a liquid. The comonomer (ethylene) gas is fully dissolved in the liquid solvent. The feed is cooled to 5° C. before injection into the reactor. The reactor operates at polymer concentration from 15 wt % to 20 wt %. The adiabatic temperature rise of the solution accounts for some of the heat removal from the polymerization reaction. Heat exchangers within the reactor are utilized to remove the remaining heat of reaction allowing for reactor temperature control at the reaction temperatures.

The solvent used is a high purity iso-paraffinic fraction available from Exxon under the trademark ISOPAR E. Fresh propylene is passed through a bed of SELEXSORB COS for purification, before mixing with a recycle stream containing solvent, propylene, ethylene, and hydrogen. After mixing with the recycle stream, the combined stream is passed through a bed of 75 wt % Molecular Sieve 13× and 25 wt % Selexsorb CD for further purification before using a high pressure 700 psig (4826 kPa) feed pump to pass the contents to the reactor. Fresh ethylene is passed through a SELEXSORB COS bed for purification before compressing the stream to 750 psig (5171 kPa). Hydrogen (a telogen used to reduce molecular weight) is mixed with the compressed ethylene before the two are mixed/dissolved into the liquid feed. The total stream is cooled to an appropriate feed temperature (5° C.). The reactor operates at 500-525 psig (3447-3619 kPa) and the control temperature is reported in Table 1A. The propylene conversion in the reactor is maintained by controlling the catalyst injection rate. The reaction temperature is maintained by controlling the water temperature across the shell side of the heat exchanger at 85° C. The residence time in the reactor is short (10 minutes). The propylene conversion per reactor pass is also reported in Table 1A.

Upon exiting the reactor, water and additive are injected into the polymer solution. The water hydrolyzes the catalyst, terminating the polymerization reaction. The additives consist of antioxidants, i.e., 500 ppm of a phenolic and 1000 ppm of a phosphite, which remain with the polymer, and act as stabilizers to prevent polymer degradation, while in storage. The post-reactor solution is super-heated from reactor temperature to 230° C., in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene, are sent to a block flare and burned.

The process conditions for P/E 1 and P/E 2 are provided in Table 1A below. The properties for P/E 1 and P/E 2 are provided in Table 2 below.

TABLE 1A

Process Conditions for P/E 1 and P/E 2

| | P/E 1 | P/E 2 | | P/E 1 | P/E 2 |
|---|---|---|---|---|---|
| Reactor Control Temp. (° C.) | 155 | 155 | Catalyst Flow (lb/hr) | 0.5 | 1.2 |
| Solvent (ISOPAR-E) Feed (lb/hr) | 381 | 404 | Catalyst Conc. (ppm) | 400 | 275 |
| Propylene Feed (lb/hr) (monomer) | 188 | 199 | Cocatalyst-1 Flow (lb/hr) | 0.5 | 0.9 |
| Ethylene Feed (lb/hr) (comonomer) | 13 | 13 | Cocatalyst-1 Conc. (ppm) | 6,000 | 6,000 |
| Reactor Propylene Conversion (wt %) | 91 | 91 | Cocatalyst-2 Flow (lb/hr) | 0.4 | 1.0 |
| Hydrogen Feed (SCCM) | 5,200 | 3,700 | Cocatalyst-2 Conc. (ppm) | 2,000 | 2,000 |

TABLE 2

Properties for P/E 1 and P/E 2

| | P/E 1 | P/E 2 | | P/E 1 | P/E 2 |
|---|---|---|---|---|---|
| wt % $C_2$ | 6.2 | 5.8 | Mn | 12,301 | 16,702 |
| wt % $C_3$ | 93.8 | 94.2 | Mw | 27,101 | 38,060 |
| Density | 0.885 | 0.884 | Mw/Mn | 2.20 | 2.28 |
| P/E Viscosity at 177° C. (mPa · s) | 1,039 | 2,959 | Total mol % unsat/mol propylene | 0.022 | 0.024 |
| $T_m$ (° C.) | 99.8 | 99.2 | Isotacticty | | |
| $T_c$ (° C.) | 65.6 | 64.1 | (% mm) | 94.1 | 94.5 |
| % Crystallinity | 28.8 | 27.0 | (% mr) | 2.9 | 2.5 |
| $H_f$ (J/g) | 47.6 | 44.6 | (% rr) | 3.1 | 3.0 |
| Branching Index (g') | 1.00 | 1.00 | B-Value | 0.94 | 0.97 |

A. Isotacticty in Table 2 is Determined with $^{13}$CNMR—The samples are prepared by adding approximately 2.6 g of a 50/50 mixture of tetrachloroethane-d2/orthodichlorobenzene that is 0.025M in chromium acetylacetonate (relaxation agent) to 0.2 g sample in a "10 mm NMR tube." The samples were dissolved and homogenized by heating the tube and its contents to 150° C. The data were collected using a Bruker 400 MHz spectrometer equipped with a Bruker Dual DUL high-temperature CryoProbe. The data was acquired using 160 scans per data file, a 6 second pulse repetition delay with a sample temperature of 120° C. The acquisition was carried out using spectral width of 25,000 Hz and a file size of 32K data points.

2. Production of Compositions

Materials used to produce compositions, further hot melt adhesive compositions, are shown in Table 3 below. The starting materials from Table 3 are weighed and then melt blended at 177° C. for 30 min at 100 rpm, using a small can mixer equipped with temperature control. The compositions and their application performance data are provided in Table 4 below.

TABLE 3

Starting materials for compositions

| Component | Specification | Source |
|---|---|---|
| P/E 1 | See above, Table 2 | The Dow Chemical Co. |
| P/E 2 | See above, Table 2 | The Dow Chemical Co. |
| KOMOTAC KM-100 (KM-100) | Rosin ester ring and ball softening point = 92-100° C. color, Gardner (ASTM D1544) = 5 Acid number = 25 mg KOH/g Aliphatic Carbon[#] = 82.8 mol % Ester Group Carbon[#] = 2.2 mol % Oxygenates[#] = 2.5 mol % Combined Amount Unsaturated Carbon and Aromatic Carbon[#] 12.4 mol % Combined Amount Aldehyde Group Carbon and Ketone Group Carbon[#] = 0.1 mol % | Guangdong Komo Co., Ltd. |
| KOMOTAC KM-100W | Rosin ester ring and ball softening point = 100° C. Aliphatic Carbon[#] = 81.4 mol % Ester Group Carbon[#] = 2.4 mol % | Guangdong Komo Co., Ltd. |

TABLE 3-continued

Starting materials for compositions

| Component | Specification | Source |
|---|---|---|
| (KM-100W) | Oxygenates[#] = 2.4 mol % Combined Amount Unsaturated Carbon and Aromatic Carbon[#] = 13.7 mol % Combined Amount Aldehyde Group Carbon and Ketone Group Carbon[#] = 0.1 mol % | |
| EASTOTAC H100W (H100W) | Tackifier-hydrogenated hydrocarbon resin density = 1.04 g/mL Acid number = <0.1 mg KOH/g ring and ball softening point = 100° C. form = Flake melt viscosity at 190° C. (Brookfield) = 200 mPa · s color, Gardner (ASTM D1544) = <1 Ester Group Carbon[±] < 0.1 mol % | Eastman |
| LICOCENE PP 6102 (PP 6102) | Polypropylene wax metallocene-catalyzed polypropylene wax, white fine grain density = 0.90 g/cc (at 23° C.) acid value = 0 mg KOH/g melt viscosity at 170° C. (Brookfield) = 60 mPa · s | Clariant |
| LICOCENE PE 4201 (PE 4201) | Polyethylene wax metallocene-catalyzed polyethylene wax, white fine grain density = 0.97 g/cc (at 23° C.) melt viscosity at 140° C. (Brookfield) = 40-80 mPa · s | Clariant |
| MILLAD NX8000 (NX8000) | Nucleating agent | Milliken Chemical |
| IRGANOX 1010 (AO) | Antioxidant pentaerythritol tetrakis(3-(3,5-di-tert-butyl-4-hydroxyphenyl)propionate) (CAS 6683-19-8) density = 1.15 g/cc | BASF |

[#]As measured by $^{13}$C NMR, based on the total moles of carbon in the rosin ester.
[±]As measured by $^{13}$C NMR, based on the total moles of carbon in the hydrogenated hydrocarbon resin.

TABLE 4

Compositions*

| | CS 1 | Ex. 1 | Ex. 2 | CS 2 | Ex. 3 | Ex. 4 | Ex. 5 |
|---|---|---|---|---|---|---|---|
| P/E 1 | 81.3 | 81.3 | 81.3 | — | — | — | — |
| P/E 2 | — | — | — | 59.3 | 59.3 | 59.3 | 59.5 |
| KM-100 (rosin ester) | — | 16.0 | — | — | 17.0 | — | — |
| KM-100W (rosin ester) | — | — | 16.0 | — | — | 17.0 | 17.0 |
| H110W (tackifier) | 16.0 | — | — | 17.0 | — | — | — |
| PP 6102 (wax) | 2.0 | 2.0 | 2.0 | 23.0 | 23.0 | 23.0 | — |
| PE 4201 (wax) | — | — | — | — | — | — | 23.0 |
| NX8000 (nucleating agent) | 0.2 | 0.2 | 0.2 | 0.2 | 0.2 | 0.2 | — |
| AO | 0.5 | 0.5 | 0.5 | 0.5 | 0.5 | 0.5 | 0.5 |
| Total | 100% | 100% | 100% | 100% | 100% | 100% | 100% |
| Viscosity[†] @ 177° C. mPa · s | 832 | 780 | 765 | 994 | 931 | 934 | 807 |
| Set Time (sec) | 3 | 13 | 14 | 4 | 7 | 9 | 3 |
| Open Time (sec) | 31 | 52 | 50 | 42 | 50 | 54 | 20 |
| Heat Stress (° C.) | 50 | 60 | 55 | 45 | 80 | 75 | 75 |
| PAFT (° C.) | 57.5 | 61.0 | 58.5 | 68.3 | 53.3 | 50.4 | 64.9 |
| SAFT (° C.) | 101.9 | 102.7 | 101.9 | 117.1 | 117.4 | 116.6 | 108.4 |
| Fiber Tear (%) −40° C. | 98 | 91 | 87 | 100 | 94 | 96 | 5 |
| −17° C. | 99 | 89 | 77 | 99 | 98 | 95 | 6 |
| 0° C. | 91 | 91 | 98 | 98 | 96 | 94 | 7 |
| 23° C. | 96 | 99 | 96 | 96 | 100 | 94 | 9 |
| 60° C. | 90 | 78 | 73 | 96 | 82 | 70 | 86 |

CS = Comparative Sample
*Table 4 values are weight percent (wt %), based on the total weight of the composition
[†]Viscosity of the composition As shown in Table 4, compositions containing a propylene/ethylene interpolymer (P/E 1 and P/E 2), and a rosin ester containing greater than, or equal to, 75 mol % aliphatic carbon, and less than, or equal to, 3.0 mol % ester group carbon, based on total moles of carbon in the rosin ester (KOMOTAC™ KM-100 or KOMOTAC™ KM-100W), exhibit higher heat resistance (demonstrated by a passing heat stress of ≥55° C.) than comparative compositions containing a propylene/ethylene interpolymer and a hydrogenated hydrocarbon (i.e., EASTOTAC H100W) (Compare Ex. 1-5 with CS 1 and CS 2). Moreover, compositions containing the propylene-based polymer wax (LICOCENE PP 6102) exhibit fiber tear greater than 50%, in the range of −40° C. to 60° C. (see Ex. 1-4).

It is specifically intended that the present disclosure not be limited to the embodiments and illustrations contained herein, but include modified forms of those embodiments including portions of the embodiments and combinations of elements of different embodiments as come within the scope of the following claims.

We claim:
1. A composition comprising the following:
(A) from 55 wt % to 85 wt % of a propylene-based interpolymer that is a propylene/ethylene copolymer having the following:
 (i) a density from 0.850 g/cc to 0.900 g/cc; and
 (ii) a melt viscosity, at 177° C., from 500 mPas to less than 3,000 mPas,
 (iii) a melting temperature from 90° C. to 100° C.; and
(B) from 16 wt % to 17 wt % of a rosin ester polymer comprising in polymerized form abietic acid and dicyclopentadiene, the rosin ester polymer comprising the following:
 (i) greater than, or equal to, 75 mol % aliphatic carbon, based on total moles of carbon in the rosin ester;
 (ii) less than, or equal to, 3.0 mol % ester group carbon, based on total moles of carbon in the rosin ester;
 (iii) a Ring and Ball softening temperature from 92° C. to 100° C.; and
(C) from 1 wt % to 25 wt % of a propylene-based polymer wax that has a melt viscosity, at 170° C., from 40 to 100 mPa·s, and a density from 0.88 to 0.92 g/cc;
(D) from 0.1 wt % to 0.5 wt % of a nucleating agent;
wherein the composition has
 a heat stress greater than, or equal to, 55° C., and
 the composition has a melt viscosity at 177° C. from 500 mPa·s to 950 mPa·s.

2. The composition of claim 1, wherein the rosin ester comprises from 75 mol % to 95 mol % aliphatic carbon, based on total moles of carbon in the rosin ester.

3. The composition of claim 1, wherein the rosin ester comprises from 0.5 mol % to 3.0 mol % ester group carbon, based on the total moles of carbon in the rosin ester.

4. The composition of claim 1, wherein the weight ratio of the propylene-based interpolymer to the propylene-based polymer wax is from 2.0:1.0 to 5.0:1.0.

5. The composition of claim 1, wherein the combined amount of (A) propylene-based interpolymer and (B) rosin ester equals at least 60 wt % of the composition.

6. The composition of claim 1, wherein the weight ratio of the (A) propylene-based interpolymer and the (B) rosin ester is from 3.0:1.0 to 6.0:1.0.

7. An article comprising at least one component formed from the composition of claim 1.

8. The composition of claim 1 wherein the composition comprises
   (A) from 80 wt % to 85 w % of the propylene-based interpolymer;
   (B) from 15 wt % to 19 wt % of the rosin ester; and
   (C) from 1 wt % to 3 wt % wax.

9. The composition of claim 8, wherein the composition has a shear adhesion failure temperature (SAFT) of from 100° C. to 120° C.

10. The composition of claim 1 wherein the weight ratio of the rosin ester to the wax is from 0.4:1.0 to 1.0:1.0.

* * * * *